US 9,521,177 B2

(12) United States Patent
Gahm et al.

(10) Patent No.: US 9,521,177 B2
(45) Date of Patent: Dec. 13, 2016

(54) NETWORK-BASED ADAPTIVE RATE LIMITING

(71) Applicant: CISCO TECHNOLOGY, INC., San Jose, CA (US)

(72) Inventors: Joshua B. Gahm, Newtonville, MA (US); Aimin Ding, Westford, MA (US); Rong Pan, Saratoga, CA (US); Zhi Li, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 599 days.

(21) Appl. No.: 14/024,210

(22) Filed: Sep. 11, 2013

(65) Prior Publication Data

US 2015/0074285 A1    Mar. 12, 2015

(51) Int. Cl.
*G06F 15/16* (2006.01)
*H04L 29/06* (2006.01)
*H04L 12/801* (2013.01)

(52) U.S. Cl.
CPC ............. *H04L 65/601* (2013.01); *H04L 47/11* (2013.01)

(58) Field of Classification Search
CPC ............................... H04L 65/601; H04L 47/11
USPC .......................................................... 709/231
See application file for complete search history.

(56) References Cited

U.S. PATENT DOCUMENTS

| | | | |
|---|---|---|---|
| 7,665,113 B1 | 2/2010 | Abrams | |
| 7,944,863 B2 | 5/2011 | Smith et al. | |
| 7,995,476 B2 | 8/2011 | Lou et al. | |
| 8,350,971 B2 | 1/2013 | Malone et al. | |
| 2004/0013089 A1 | 1/2004 | Taneja et al. | |
| 2010/0299552 A1* | 11/2010 | Schlack | H04L 47/10 714/4.1 |
| 2012/0124179 A1 | 5/2012 | Cappio et al. | |
| 2012/0218892 A1* | 8/2012 | Kotecha | H04L 47/14 370/235 |
| 2013/0003543 A1* | 1/2013 | Ludwig | H04L 47/78 370/230 |
| 2013/0138828 A1 | 5/2013 | Strasman et al. | |

FOREIGN PATENT DOCUMENTS

WO    WO 2011/139305 A1    11/2011

OTHER PUBLICATIONS

International Search Report and Written Opinion; International Appl. No. PCT/US2014/051084 Filed Aug. 14, 2014; Applicant: Cisco Technology, Inc.; Date of Mailing: Oct. 17, 2014; 11 pgs.

(Continued)

*Primary Examiner* — Viet Vu
*Assistant Examiner* — Herman Belcher
(74) *Attorney, Agent, or Firm* — Merchant & Gould P.C.

(57) ABSTRACT

An apparatus can include a session rate limit calculator and a rate limiter. The session rate limit calculator can be configured to compute a session rate limit for a given session of a plurality of active streaming media sessions based on state information for the given session and state information for a downstream bottleneck link to which the apparatus feeds the plurality of active streaming media sessions. The rate limiter can be configured to control downstream traffic for the given session based on the computed session rate limit and to provide corresponding rate-limited downstream traffic for the given session.

20 Claims, 5 Drawing Sheets

(56) References Cited

OTHER PUBLICATIONS

Rémi Houdaille, et al.; "Shaping HTTP Adaptive Streams for a Better User Experience", Proceeding MMSys '12 Proceedings of the $3^{rd}$ Multimedia Sytems Conference, Feb. 22, 2012, pp. 1-9.
"Probe and Adapt: Rate Adaptation for HTTP Video Streaming at Scale", XF055077352, Retrieved from the Internet: URL:http://arxiv.org/pdf/1305.0510v2.pdf [retrieved on Sep. 2, 2013].

\* cited by examiner

NETWORK-BASED ADAPTIVE RATE LIMITING

TECHNICAL FIELD

This disclosure relates to network communications and, more particularly, to rate limiting.

BACKGROUND

Adaptive bitrate streaming is a technique used in streaming multimedia to one or more clients over computer networks, such as can be provided according to a transfer protocol (e.g., hypertext transfer protocol (HTTP)). Adaptive streaming generally operates by adjusting the rate of a video stream according to bandwidth and capacity of a respective client. The client can in turn switch between streaming at different encoding bitrates depending on available resources. When multiple adaptive streaming clients compete with each other for bandwidth at a bottleneck link, each client can have difficulty estimating its own share of bandwidth. As a result of such poor adaptive decisions at one or more clients, this can lead to instabilities and/or frequent bitrate changes that can be distracting to users.

DESCRIPTION OF EXAMPLE EMBODIMENTS

Overview

This disclosure relates generally to network communications and, more particularly, to network-based adaptive rate limiting.

As an example, a method can include assigning a weight to a given streaming session of a plurality of adaptive streaming media sessions provided to a network node that feeds a bottleneck link. A rate limit for the given streaming session can be calculated based on the assigned weight and an effective target bandwidth for providing streaming media traffic to the plurality of adaptive streaming media sessions via the bottleneck link. A downstream rate for the given streaming session can be adjusted according to the calculated rate limit.

As another example, an apparatus can include a session rate limit calculator and a rate limiter. The session rate limit calculator can be configured to compute a session rate limit for a given session of a plurality of active streaming media sessions based on state information for the given session and state information for a downstream bottleneck link to which the apparatus feeds the plurality of active streaming media sessions. The rate limiter can be configured to control downstream traffic for the given session based on the computed session rate limit and to provide corresponding rate-limited downstream traffic for the given session.

As yet another example, a system can include memory to store session data and bottleneck data. The session data can include state information for each of a plurality of adaptive streaming media sessions, the bottleneck data including control parameters and state information for a bottleneck link through which the plurality of adaptive streaming media sessions are provided downstream. A control system can include a session rate limit calculator configured to compute a session rate limit for a given session of the plurality of adaptive streaming media sessions that varies based on the control parameters and the state information for the bottleneck link. A session rate limiter can be configured to control a bitrate for the given session provided downstream via the bottleneck link based on the session rate limit as to provide corresponding rate-limited downstream traffic for the given session. The control for the bitrate for the given session can be performed on a different time scale than used to update at least one of the control parameters and the state information for the bottleneck link.

Example Embodiments

Figure 1:
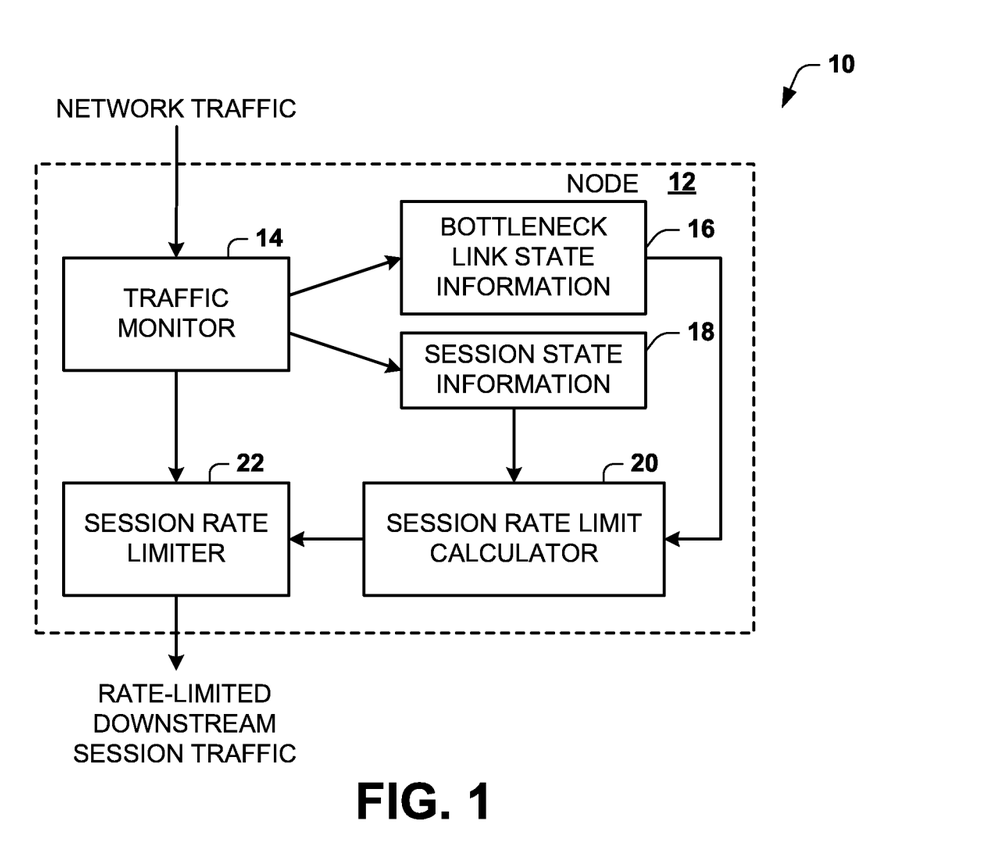
FIG. 1 illustrates an example of an adaptive rate limiting system.

FIG. 1 depicts an example of a system 10 that can implement rate limiting for network traffic such as being transmitted through a network and feeding a bottleneck link in such network. As used herein, a bottleneck link thus refers to a point or location in a network through which one or more data flows pass for communicating streaming media to one or more clients. The downstream traffic flowing on the bottleneck link can be sufficient to drive the bottleneck link into congestion once the clients have all upshifted to sufficiently high bitrates.

As an example, network-based adaptive rate limiting thus can be implemented on a network node (e.g., a router or switch) 12 that serves as the ingress to a bottleneck link carrying the traffic for a number of adaptive streaming sessions in the downstream direction (e.g., from network to client). The traffic for a plurality of data flows is also referred to herein as sessions. The node 12 is configured to provide corresponding rate-limited downstream traffic for one or more of such sessions. Additionally, as used herein, a given session can corresponding to one or more protocol connections, such as according to the transmission control protocol (TCP). As a further example, each of the examples disclosed herein can correspond to a hyper text transfer protocol (HTTP) communication protocol, such as can be communicated over TCP for streaming media (e.g., communicated as HTTP/TCP). In another example, requests and responses for each session could be communicated according to the SPDY protocol (e.g., communicated as HTTP/SPDY/TCP). In yet another example, the quick UDP Internet connections (QUIC) can be utilized as a transport layer network protocol for communicating the session (e.g., communicated as HTTP/SPDY/QUIC). Other protocols could also be utilized. In some examples, the sessions can include HTTP adaptive streaming (HAS) sessions for delivery of streaming video from a content delivery network to one or more respective downstream clients.

As disclosed herein, the system 10 implements adaptive rate limiting on a per session basis by adjusting per session bitrate limits for each active session to facilitate and enable the adaptive session clients to make stable rate selections and improve the overall user experience. As used herein, the rate limiting can include traffic policing, traffic shaping or a combination thereof. Policing and shaping can be applied to any network protocol.

In the example of FIG. 1, the system 10 includes a traffic monitor 14 that is configured to monitor network traffic and receive related parameters. The traffic monitor 14 can provide software-configured information for the network, such as including bottleneck link state information 16 as well as per session state information 18. For example, the bottleneck link state information 16 can include a value indicating a target bandwidth for the bottleneck link that is driven downstream by the node 12. The bottleneck link state information 16 can also include an indication of an aggregate weight value for the active downstream sessions. Thus, the bottleneck link state information 16 can include information about the state of the bottleneck link as well as aggregate information associated with the network traffic, including aggregate information about the respective sessions.

The session state information 18 can be provided for each of a plurality of sessions. This can include active as well as inactive sessions. In other examples, data for inactive sessions can be removed. As an example, for each session, the session state information 18 can include a session identifier, a weight value assigned to the session, as well as other pertinent session information (e.g., a state value indicating if a session is active or inactive, a time stamp corresponding to the last packet transmitted across the downstream bottleneck link for the session).

As disclosed herein, the bottleneck link state information and session state information can be provided by the traffic monitor based on monitoring traffic through such link. In addition to the active network traffic monitoring function of the traffic monitor 14, the traffic monitor can include a controller (not shown) configured to receive software-configured parameters, such as including an indication of a target bandwidth and weight values assigned to the respective sessions. The traffic monitor 14 thus can include one or more calculators to compute other traffic-related parameters based on the configured information it receives. For instance, since state information 18 for each session can include a corresponding session weight value, the total weight value in the bottleneck link state information 16 can be derived from the individual state information that is assigned for each the plurality of active sessions. The determination of whether a session is active or not can also be made by the traffic monitor 14.

A session rate limit calculator 20 is configured to compute a session rate limit for a given session of a plurality of active streaming media sessions based on the bottleneck link state information 16 and the session state information 18 for the given session. A session rate limiter 22 is configured to provide rate-limited downstream session traffic based on the rate limit computed by the calculator 20. The session rate limiter 22 can be implemented according to different rate limiting techniques such as can include traffic policing, traffic shaping or a combination of shaping and policing functions. As disclosed herein, there can be any number of rate session calculators and session rate limiters 20 and 22, respectively, depending on the number of sessions for implementing corresponding rate limiting for each of the plurality of active streaming media sessions. The rate-limited downstream traffic for each session can be aggregated and provided to the transmission queue for sending through the bottleneck link. It is to be understood and appreciated that the rate limiting system 10 can be implemented within the given node 12 as hardware, executable instructions stored in a non-transitory computer readable media or a combination of hardware and executable instructions. The adaptive rate limiting approach thus can mitigate stalls, improve video quality, and improve stability of streaming video media.

Figure 2:
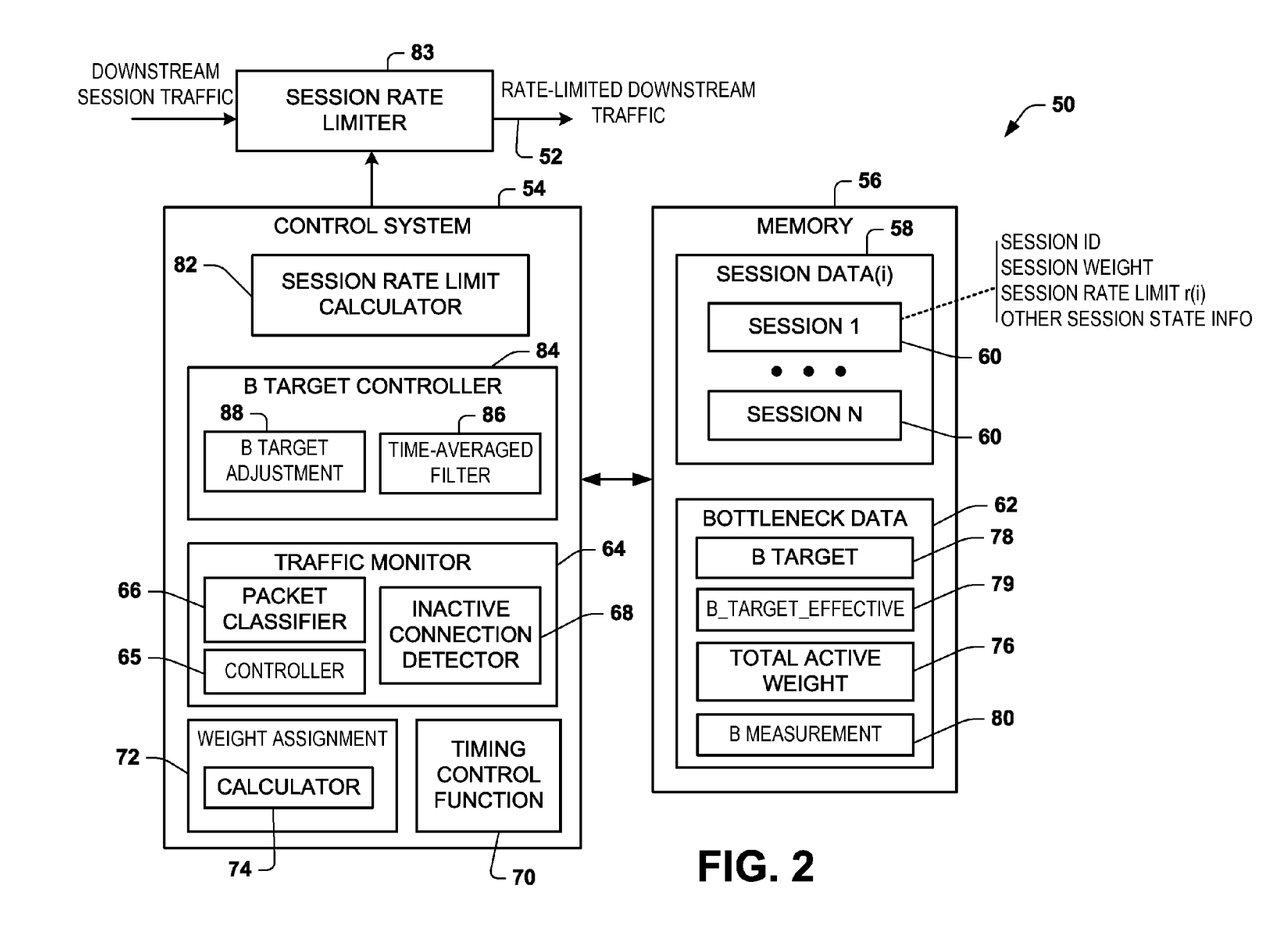
FIG. 2 illustrates another example of an adaptive rate limiting system.

FIG. 2 depicts an example of a rate limiting system 50 that can be implemented at a node that feeds data through a bottleneck link of a communications network. The rate limiting system 50 is configured to receive downstream session traffic according to a given transfer protocol and provide corresponding rate-limited downstream traffic to the bottleneck link for feeding a plurality of downstream clients. The rate limiting system 50 has particular utility when applied to rate limiting on downstream traffic that is provided to a plurality of HTTP adaptive streaming (HAS) clients as corresponding streaming media sessions. In such an example, the HAS clients can compete for available bandwidth by switching between different encodings for the requested streaming media. As disclosed herein, the adaptive rate limiting system 50 can dynamically calculate a rate limit for each respective streaming session based on state information associated with each active streaming session and state information associated with the bottleneck link 52. The system 50 can in turn adjust the downstream bitrate for each respective active streaming session according to the calculated rate limit for each respective session.

In the example of FIG. 2, the system 50 includes a control system 54 that is configured to control rate limiting parameters utilized in adjusting the rate limit. The system 50 can also include memory 56 that can store session data 58 for each of a plurality of sessions 60, indicated at session 1 through session N, where N is a positive integer. The control system 54 can execute corresponding functions (e.g., calculators and control loops) that can be utilized to update the session data for each respective session 60. The control system 54 can also include functions and methods configured to determine bottleneck data 62.

The session data for each respective session can include parameters associated with the identity and operation for each respective session. Such session data can include, for example, a session identifier (ID), a session weight value, a session rate limit r[i] (where i denotes a given session), as well as other session state information that may be utilized in implementing the rate limiting of the system 50. The control system 54 can be implemented as including one or more processing core, an arithmetic logic unit, or other device that can access and execute corresponding instructions (e.g., from memory) to control and process session related data for performing the session rate limiting of the system 50.

The control system 54 can include a traffic monitor 64 configured to monitor the aggregate downstream traffic that is provided to the node implementing the system 50. The traffic monitor 64 can include a controller 65 configured to receive network parameters, which can be utilized by the control system for implementing the rate limiting. For example, the network parameters can include a target bandwidth that is available for all downstream sessions as well as respective weight values for each active session as well as other parameters that may be established by other parts of the network.

Additionally, the traffic monitor 64 can include a packet classifier 66 that can be used to monitor packet headers and determine to which session a given packet belongs. For example, the packet classifier can be programmed to detect a source address of a given connection, a destination address of a given connection or corresponding port information associated with the downstream traffic that is received.

The traffic monitor 64 can also include an inactive connection detector 68 that is configured to determine if a given session is active. In some examples, the inactive connection detector can run as a background process periodically to detect inactive and active sessions and update corresponding session data 58 accordingly. As an example, an inactive connection can be determined to exist if the time of the last transmission plus a predetermined timeout constant exceeds the current timestamp value. The timeout constant can be set to value to control how long an active connection must remain idle before it is considered inactive. The current timestamp value can be maintained by a timing control function 70, for example. The session activity status, being active or inactive for a given connection, can be stored as part of the session data 58 for a given session 60.

As used herein, a given session can include one or more connections, such as TCP connections. The traffic monitor 64 thus can be configured to group multiple related TCP connections into a single session, such as based on the destination address for the TCP connection. For instance, in the case where a destination address corresponds to a single household or a single managed set-top box within a household, data packets corresponding to plural TCP connections can be grouped into a single downstream session. The particular header parameters in the downstream packets that would be utilized can depend on the particular access network technology being utilized by the downstream clients. In either event, the adaptive rate limiting system 50 can be implemented to dynamically calculate the rate limit value for a given session without employing deep packet inspection.

The control system 54 also includes a weight assignment function 72 that is configured to assign a weight value w[i] that can be stored as a per session weight value in the session data 58 for each session 60. For example, each session weight value can be a positive real number indicating a relative bandwidth share that will be allocated to each respective session as compared with other active sessions. The weight value can be a predetermined fixed for each session or it can be computed as a variable value. For instance, to provide equal shares of bandwidth to all sessions, all of session weight values can be set to the same value (e.g., 1.0). Alternatively, unequal sharing of bandwidth could be achieved by setting unequal weight values for different sessions. The weight assignment function 72 can assign the weight based on data from an upstream device (e.g., a cable central office) or based on information provided from downstream clients.

By way of example, different per session weight values w[i] can be set according to a service level agreement, such as to implement a plurality of different levels of service (e.g., gold level having a higher weight than silver, which has a higher weight than bronze service). The level of service can be fixed for a subscriber or it can vary according to a request for a streaming media. As another example, a request for streaming media initiated by a given adaptive can specify a level of service (e.g., a minimum resolution), which can be specified automatically based on the capabilities of the player or device or in response to user input manually specifying a desired resolution.

In some examples, the weight assignment function 72 can include a calculator 74 that is configured to compute the weight value for each session, such as based on a plurality of different parameters that can collectively be used to determine a per session weight value. For instance, where a given session includes a plurality of sessions (e.g., TCP connections), the weight value can further depend on the number and type of the connections.

As a further example, the downstream client can employ signaling to communicate data upstream based on which the weight assignment function 72 can determine a corresponding weight for each respective session. The signaling can be provided concurrently with a request for streaming media or it can be provided dynamically during streaming, such as to enable additional rate limit adjustments during streaming.

The calculator 74 can also compute an aggregate weight for the currently active media sessions, which can be stored as a total active weight 76 in the bottleneck data 62 as part of the bottleneck data 62. Additionally, in response to detecting an inactive session (e.g., by the inactive connection detector 68), the calculator 74 can update the total active weight value 76 by subtracting the weight value of the inactive session from the current total active weight value for the bottleneck link. In this way, the rate limiting can be dynamically adjusted to account for only those sessions that are currently active (e.g., as determined by the traffic monitor 64).

The bottleneck data 62 can also include a target bandwidth (B_target) value 78 corresponding to an intended target bandwidth of the sessions fed by the network node via the bottleneck link 52. The target bandwidth 78 for the bottleneck link can be a configured parameter that is received by the control system 54 and stored in the bottleneck data 62. For instance, the target bandwidth 78 can be known a priori or it can be provided as an input parameter (e.g., software-configured data), such as determined by a router or other equipment operating at the node where the rate limiting system 50 resides. The target bandwidth 78 can be fixed or a variable depending on the implementation of the system 50. The bandwidth 78 can be less than or equal to the available bandwidth at the bottleneck link 52.

The session rate limit calculator 82 can compute the session rate limit based on the session data for a given session 60 and the bottleneck data 62. For example, the session rate limit calculator 82 can compute the session rate limit based upon the weight assigned to the given session w[i] and an effective target bandwidth (B_target_effective) 79. The effective target bandwidth (B_target_effective) 79 can be a variable that is determined to control how much bandwidth is actually allowed for each active session. As a further example, the rate limit r[i] can be expressed as follows:

$$r[i] = B\_target\_effective \cdot w[i]/total\_active\_weight \qquad \text{Eq. 1}$$

where: total_active_weight is the sum of all weight values w[i] for all active sessions.

The system 50 also includes a session rate limiter 83 that is configured to implement rate limiting on the downstream session traffic. The rate-limited downstream session traffic can be provided to the bottleneck link 52 with other rate-limited session traffic. The session rate limiter 83 can be configured to implement one or more of traffic policing and traffic shaping or any similar technique (e.g., bandwidth reservation algorithms or scheduling algorithms). For example, the session rate limiter 83 can implement a token bucket algorithm to conform the bitrate of downstream traffic based on the rate limit r[i]. While the example of FIG. 2 demonstrates a given rate limit calculator 82 and session rate limiter 83 associated with a given session, the system 50 can include any number of rate limit calculators and session rate limiters to provide corresponding rate-limited downstream session traffic for each respective session. Additionally, while the rate limiter 83 is demonstrated external to the control system 54 in the example of FIG. 2, in other examples, the rate limiter for each session could be implemented as part of the control system (e.g., separate hardware and/or software).

In some examples, rate limiter 83 can be configured to adapt the rate limit r[i] according to actual bandwidth utilization based on controlling one or more control parameters (e.g., including B_target_effective in Eq. 1). The control system 54 thus can include a bandwidth target controller (B target controller) 84 configured to compute the B_target_effective 79 for the bottleneck link. For instance, the bandwidth target controller 84 can adjust B_target_effective so that the measured throughput for the bottleneck link approaches the target bandwidth (e.g., B_target) 78 established for the bottleneck link. As mentioned above, the target bandwidth 78 can be an input parameter to establish the total bandwidth intended for use by all active sessions.

By way of example, some clients may not use their full bandwidth share because they do not have the screen resolution or CPU power required to render high resolution content. Alternatively or additionally, some clients may be watching content for which higher encoding rates are not available (e.g. SD content as opposed to HD content). Most existing streaming media players are "conservative" in the sense that they try to use less bandwidth than their estimated available bandwidth. This is done to avoid upshifting to higher rates that would not be sustainable given a slight drop in network throughput. In situations where the clients might underutilize the available bandwidth, the bandwidth target controller 84 allows clients that could make use of more bandwidth (e.g., HD clients) to claim the extra bandwidth that is not being utilized (e.g., it is "left on the table") by other clients (e.g., SD clients).

The bandwidth target controller 84 can include a time averaged filter 86 to perform time averaging with respect to bandwidth measurement data 80, such as can be stored in the bottleneck data. For example, the node implementing the system 50 can be configured to measure bandwidth at the bottleneck link 52 and provide a corresponding measure of the bandwidth. The timing control function 70 can control the time average filter 86, such that the time window of bandwidth measurements being averaged by the filter 86 is longer than a fragment size for the respective streaming session. This can help ensure that the bandwidth measurement 80 used by the bandwidth target controller 84 is sufficient to filter out the on/off pattern of the adaptive bitrate traffic that tends to occur when the respective client is in a steady state of operation.

The bandwidth target controller 84 also includes a bandwidth target adjustment control 88 that is configured to adjust the effective target bandwidth (e.g., B_target_effective from Eq. 1) dynamically to allow the downstream adaptive bitrate streaming clients to function in a stable manner. The bandwidth target adjustment control 88 can adjust B_target_effective 79 based on the established target bandwidth B_target 78 and the time averaged bandwidth measurement 80, which corresponds to a moving average of the aggregate bandwidth measured for all active media sessions on the bottleneck link 52. In some examples, the bandwidth target controller 84 can set the adjusted effective target bandwidth to be greater than or equal to the predetermined target bandwidth (B_target) parameter 78, for example. Since the bandwidth time average bandwidth measurement will change over time, the bandwidth target adjustment control 88 of the bandwidth target controller 84 can implement closed loop feedback control in which the effective target bandwidth (e.g., B_target_effective from Eq. 1) is adjusted so that the time-averaged bandwidth measurement 80 stays as close as possible to the established target bandwidth B_target 78. For example, the bandwidth target controller 84 can implement its closed loop feedback control to adjust the target bandwidth according to any of a variety of different control paradigms, such as including proportional control, proportional and integral (PI) control, proportional-integral-derivative (PID) control, integral control (I), or additive increase, multiplicative decrease (AIMD) control.

In some examples, such as where the B target controller 84 is configured to adapt for actual bandwidth utilization, the weight assignment function 72 can be configured to add a degree of randomization to the weight values assigned to each client. By randomizing the weight values slightly, the rate limit calculator 82 will inject some randomness into the computed rate limit. As a result, each session will receive a slightly different share of the target bandwidth, even in situations where the sessions are provided to clients implementing the same or substantially similar adaptive streaming algorithms. Thus, the randomization can increase stability by mitigating situations where identically configured clients might otherwise upshift or downshift in unison.

As an example, the weight value w[i] assigned to each session might be modified by a jittering function as multiplier term J(i, t), where i is the index of the session and t is time. Thus, the weight assignment function 72 can employ the calculator 74 to compute the bandwidth share for each session (or a selected subset of the sessions) as a randomized weight function w'(i,t), which can be substituted into the session weight value w[i] of Eq. 1 for each respective session. An example of the randomized weight function can be as follows:

$$w'(i,t)=J(i,t)*w[i] \quad \text{Eq. 2}$$

In choosing the jittering function J(i,t) for this purpose, the following conditions can be maintained:
1. For any fixed value of t and allowing i to vary over all clients, J(i,t) has a mean value close to 1.0 and is distributed over a range around 1.0 sufficient to prevent synchronization of upshift and downshift decisions among clients;
2. For fixed i and varying t, J(i,t) varies only slowly over time (more slowly than the fragment time); and
3. For a fixed i and varying t, J(i,t) averaged over a long period of time is close to 1.0.

The first condition can mitigate synchronization among the otherwise-similar clients. The second condition can help to ensure that the client adaptation algorithms, which effectively apply a low-pass filter to measured bandwidth, have sufficient time to adjust to the slowly varying available bandwidth before it changes. The last condition can help to ensure that, over a sufficiently long period of time, each session receives an average share of bandwidth commensurate with its assigned session weight value w[i].

One example jittering function which might be a suitable choice for J(i,t) can be expressed as follows:

$$J(i,t)=1+A*\sin(p[i]+2*\pi*t/Z) \quad \text{Eq. 3}$$

where:
A is the amplitude of the jitter effect. For example, $0<A<0.5$;
Z is the period of the jittering effect for each client. For example, $Z>120$ seconds;
p[i] is a constant that can be randomly chosen as a phase for a given client i. For example, $0<=p[i]<2*\pi$.

Many other example formulations for the J(i,t) function could be implemented to effect similar results to the approach described above.

As mentioned, the timing control function 70 is configured to control the adjustments and measurement values in a way that facilitates operation of the downstream adaptive streaming clients (e.g., HAS clients). For example, the bandwidth target adjustment control 88 can decrease the effective target bandwidth to occur on a time scale that is commensurate with or less than a fragment size for a given media session. If the time-averaged measured bandwidth for the bottleneck link 52 is less than the corresponding target bandwidth, the bandwidth target adjustment control 88 can increase the effective target bandwidth 79 for use in calculating the rate limit r[i] for each of the plurality of streaming sessions. The increases in the effective target bandwidth can be controlled (e.g., by the bandwidth target adjustment control 88) to occur on a time scale that is at least equal to or greater than a fragment size for a given media session.

It is to be understood and appreciated that a fragment size can vary depending upon the transfer protocol and the adaptive streaming function implemented by each client. As an example, the fragment time typically ranges from about two seconds to about ten seconds. Even though the adjustments of the effective target bandwidth value 79 may occur on a time scale that is related to a fragment size, the session rate limiter 83 can dynamically perform rate limiting at a much faster scale, such as about less than or equal to the roundtrip time for a given TCP connection (e.g., about 100 milliseconds). This helps to ensure that each adaptive bitrate clients' throughput remains an accurate estimate for the corresponding session rate limit r[i] that is calculated by the session rate limit calculator 82. As a result, the adaptive bitrate client can select an encoding rate that approximates its computed session rate limit r[i]. The rate calculator and rate limiter 20 and 22 can also employ different time scales for at least some of determining the measured bandwidth, for increasing the target bandwidth, for decreasing the target bandwidth and for enforcing the computed rate limit. The different time scales can be selected to mitigate competition among bitrate adaptation functions of different streaming sessions.

Figure 3:
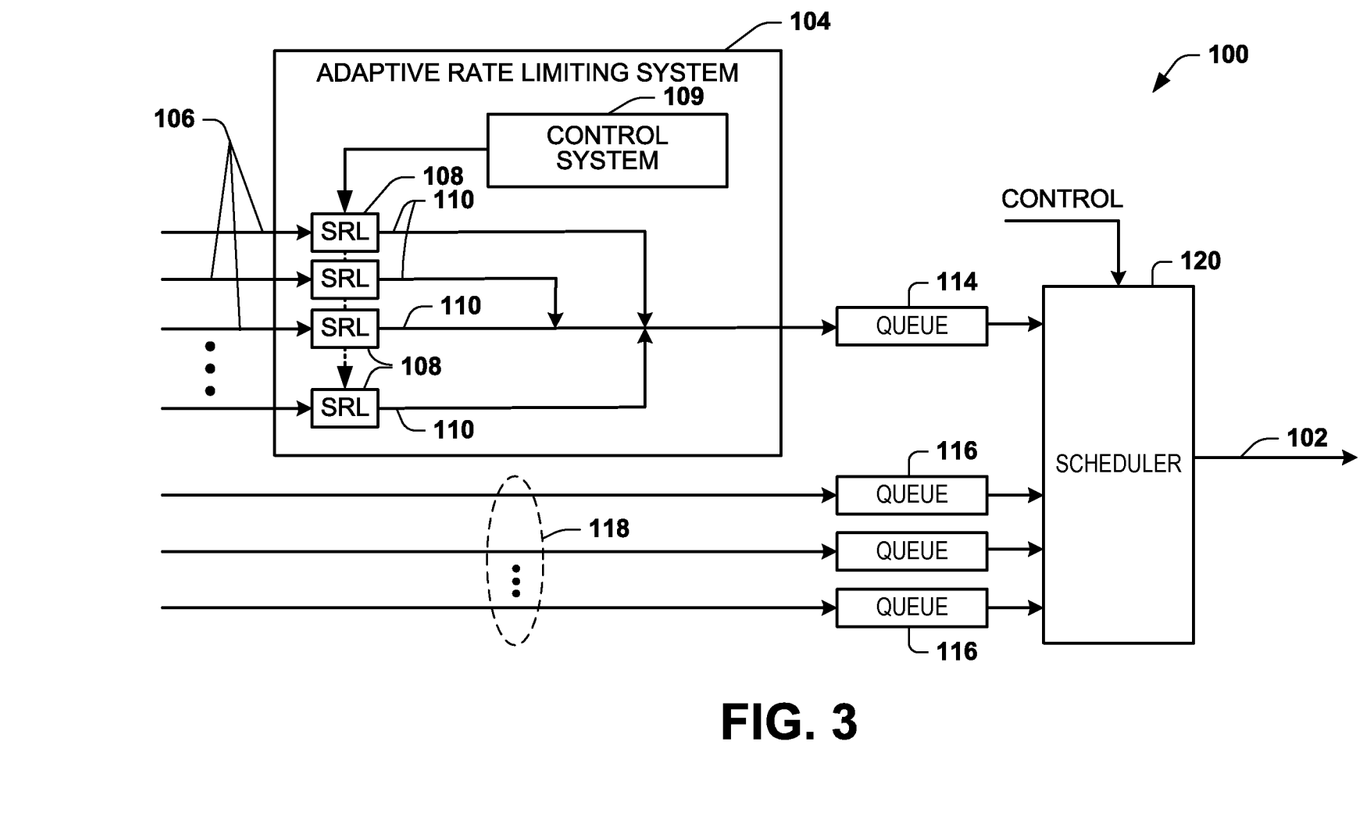
FIG. 3 illustrates an example of a system to combine adaptively rate-limited traffic and high speed data traffic.

FIG. 3 depicts an example of a system 100 configured to combine adaptively-rate-limited traffic with high speed data traffic that collectively feed a bottleneck link 102. The system 100 can be envisioned as a node of a network, and can be implemented at multiple nodes of a given network. In some examples, the node can be a corresponding edge node of the network system.

In the example of FIG. 3, the system 100 includes an adaptive rate limiting system 104. The adaptive rate limiting system 104 can be configured to operate by adaptively rate limiting one or more streaming media sessions (e.g., HAS sessions), demonstrated at 106, such as disclosed herein (see, e.g., FIGS. 1, 2 and 5). Accordingly, reference can be made to FIGS. 1, 2 and/or 5 for additional details regarding the adaptive rate limiting system 104. Briefly stated, each adaptive streaming session 106 is provided to a separate session rate limiter (SRL) 108. Each adaptive streaming session 106 can include one or more associated TCP connections. A control system 109 is configured to dynamically set the bitrate limit r[i] for each respective session rate limiter to provide corresponding rate-limited session data 110. For example, the control system 109 can receive input data (e.g., software-configured parameters), such as can include target bandwidth and session weights, which are utilized for setting the rate limit. In aggregate, the adaptive rate limiting system 104 operates to make the total throughput of the adaptive streaming sessions close to a target bandwidth. As mentioned, the target bandwidth can be fixed or variable (e.g., an effective target bandwidth can be adjusted based on a time-average measure of bandwidth, such as disclosed with respect to FIG. 2). Each session rate limiter 108 can provide its rate-limited session data 110 into a single, shared queue 114. In some examples, the queue 114 can be assigned a guaranteed bandwidth (e.g., a committed information rate (CIR) that approximates or exceeds the bandwidth target). This guaranteed bandwidth ensures that when each session is rate limited individually by its respective rate limiter 108 it will not compete with other sessions within the queuing infrastructure, corresponding to the queue 114 and a queue scheduler 120.

The system 100 also includes one or more queues 116 that receive high speed data (HSD) traffic 118, which can include any type of data traffic. The queue scheduler 120 is connected to receive the aggregate rate limited session traffic from the queue 114 and HSD traffic from the HSD queues 116. The scheduler 120 thus provides data traffic to the bottleneck link 102, which can include the rate-limited aggregate session data and the HSD traffic. Each of the queues 116 can feed traffic into the bottleneck link 102 provided, for example, that the guaranteed bandwidth of the queue 114 for the adaptive streaming traffic has been satisfied. This can occur whenever the bandwidth target is not exceeded (e.g., based on bandwidth measurement 80 of FIG. 2) or whenever the queue 114 is empty. It can also occur when the bandwidth target and guaranteed bandwidth for queue 114 are purposely set lower than the bandwidth capacity of bottleneck link 102 so as to ensure that queues 116 can always feed some level of traffic into link 102.

As an example, the guaranteed bandwidth can be a CIR=B_target. Although there is typically is no reserved bandwidth for the HSD, the HSD queues 116 can be configured to claim a relatively high share of the available excess bandwidth (e.g., set to a high excess information rate (EIR) value) as compared with the queue 114 for the HAS traffic. The EIR value provides an allowance of burstable data above the CIR that depends on the available bandwidth for the bottleneck link 102 at a given instant in time, for example. The scheduler 120 can be configured to work towards keeping the bottleneck link full with HSD data in the event that no HAS data is available to send. Other scheduling schemes can be used (e.g., set by a service provider), such as according to downstream user requirements that can be fixed or vary over time.

Figure 4:
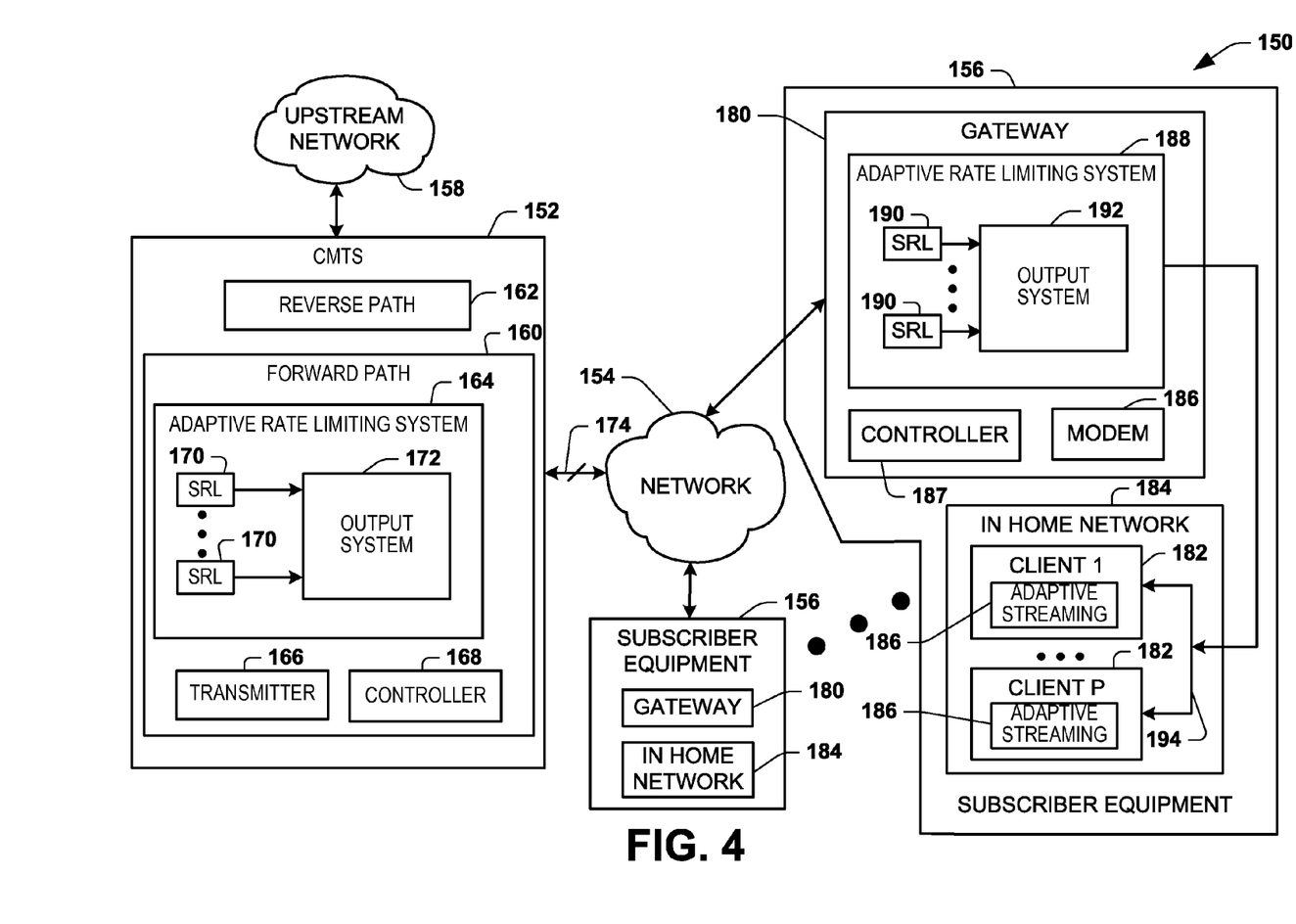
FIG. 4 illustrates an example of a network system configured to implement adaptive rate limiting.

FIG. 4 depicts an example of a network system 150 configured to implement adaptive rate limiting. The network system 150 can be implemented as any of a variety of networks, such as a cable access network system in the instant example. In the example of FIG. 4, the network system 150 includes a node corresponding to an edge router, which is demonstrated as a cable modem termination system (CMTS) 152. The CMTS 152 can be connected via a network 154 to a plurality of subscribers (e.g., each comprising customer premises equipment (CPE)) 156. The CMTS 152 can be configured to provide network services, such as cable internet, voice over internet protocol (VOIP) and other media services for the subscribers 156. For example, the CMTS 152 can be configured for operation according to one of the Data-Over-Cable Service Interface Specification (DOCSIS) network standards.

In some examples, the network 154 can be implemented as a Hybrid Fiber Coaxial (HFC) cable access network. The CMTS 152 can also be configured to connect the subscriber 156 to an upstream wide area network 158 (e.g., the public internet, public switched telephone network, or a proprietary intranet) for providing corresponding network services. In some examples, the network services can include steaming media, such as sessions provided to one or more HAS clients operating at the subscriber 156. The CMTS can thus operate as a service flow engine to a plurality of network service subscribers 156 in the network system 150. The CMTS 152 can also be coupled to a variety of additional network components and resources (not shown), such as a policy server, a provisioning system, and/or other service provider components, which may reside in the upstream network 158.

The CMTS 152 can include forward path electronics 160 and reverse path electronics 162 for communicating signals downstream and upstream, respectively, relative to the subscriber 156. The reverse path 162 thus can receive signals placed on the network 154 by each of the subscriber 156 and control their further transmission to the upstream network 158. The forward path 160 can control signals provided to each of the subscribers in the downstream direction (e.g., using TCP).

In the example of FIG. 4, the forward path 160 includes an adaptive rate limiting system 164, a transmitter 166 and controller control engine 168. The adaptive rate limiting system 164 can be configured to adaptively rate limit one or more streaming media sessions (e.g., HAS sessions), such as according to any of the approaches disclosed herein (e.g., see FIGS. 1, 2 and 5). Briefly, adaptive streaming traffic enters the CMTS 152 via the upstream network (e.g., from a service provider). The traffic for a given streaming session, which can include one or more TCP connections, is grouped together and provided to a respective adaptively rate limited session 170. Each session 170 is configured to calculate the bitrate limit for each session and perform rate limiting based on the calculated rate limit to provide corresponding rate-limited session data to an output system (e.g., an output queue or buffer for serializing the session data) 172. The transmitter 166 can send the rate-limited session data to the link (e.g., a bottleneck link) 174 for downstream distribution to the subscriber 156.

As disclosed herein, each session 170 can include a session rate limit calculator (e.g., calculator 20 of FIG. 1 or 82 of FIG. 2) to compute a session rate limit for a given session of a plurality of active streaming media sessions based on state information for the given session and state information for a downstream bottleneck link 174 to which the streaming media sessions are provided. The session 170 also includes a rate limiter (e.g., rate limiter 22 of FIG. 1 or 83 of FIG. 2) to control downstream traffic for the given session based on the computed session rate limit value r[i], and to provide corresponding rate-limited downstream traffic for the given session. The rate limit calculations and related controls can operate on a different time scale from the adjustments to the rate limit applied by the rate limiter. Additionally, the state information can be used to dynamically adjust an effective target bandwidth for the link 174 based on time averaged measurements of the downstream link bandwidth (e.g., performed by the CMTS 152). The adaptive rate limiting system 164 can perform other functions to control the rate limit, such as disclosed herein (see, e.g., FIGS. 1, 2 and 5).

The forward path control engine 168 can be configured to control operation of the forward path, such as can include setting operating parameters of the adaptive rate limiting system 164. The operating parameters can include a bandwidth target for the adaptive rate limiting system 164, weight parameters for each of the streaming media sessions and timescales for implementing respective control functions. For example, the operating parameters can be set in response to control instructions received from a central office (e.g., by an authorized administrator). Additionally or alternatively, the operating parameters can be set based on requests made at the respective subscriber 156.

As a further example, every packet sent in the downstream direction through the CMTS 152 can be assigned to a service flow (SF). The SF represents an aggregate of packets sent to a single cable modem (CM) that undergo a common quality of service (QoS) treatment. The QoS treatment applied to packets in a service flow may include rate limiting (e.g., traffic policing and/or shaping) and includes assignment of the packet to an output queue. The mapping of packets onto SFs can be based on matching of the selected fields (e.g., one or more of source IP address, source port, destination IP address, destination port) against a list of match filters (e.g., by packet classifier 66), with the first match determining the service flow assignment.

In cases where a given HAS session is assigned its own service flow, as might be the case, for example, when the HAS client is on a managed set top box device, the service flow assignment could directly map into the additional per-session state data (e.g., session data 58 of FIG. 2) that is used by the adaptive rate limiting system 164. Furthermore, since service flows in a CMTS may be configured to pass through a rate limiter (e.g., traffic policing), such rate limiting also maps well into normal CMTS operation.

As mentioned above, the adaptive rate limiting system 164 or other functions of the CMTS (e.g., or other edge router) 152 can be configured for global tracking of the total active weight and use of the r[i] values as the rate for each session. The adaptive rate limiting system 164 can be implemented as hardware, executable instructions (e.g., software, microcode or firmware) or a combination of hardware and executable instructions. In platforms where the rate limiting operation is implemented in executable instructions, adaptive rate limiting can be implemented as instructions executing on a processing core. For instance, the control engine 168 can perform the detection of inactive connections as a background process. In platforms where the rate limiting is implemented in hardware, it might be possible to implement the adaptive rate limiting (e.g., policing or shaping) by periodically updating the rate limits on each individual rate limiter in the control plane.

In the example of FIG. 4, the subscriber 156 can include CPE, such as including a gateway 180 and equipment providing an in-home network. The gateway 180 can be configured to communicate with one or more clients 182, demonstrated as client 1 through client P, where P is a positive integer denoting the number of clients in a respective in home network 184. In some examples, each of the clients 182 for a given subscriber 156 can correspond to CPE. As disclosed herein, each of the clients 182 can also be configured to implement http adaptive bitrate streaming functions 186 for streaming multimedia (e.g., MPEG video) at a selected encoding bitrate. Thus, within a given in home network, multiple adaptive streaming clients 182 can exist concurrently and thereby compete for bandwidth at a corresponding bottleneck link 194 fed by the gateway 180 in a downstream direction to the clients 182. Each of the clients 182 can be connected in the network 184 by a physical connection (e.g., electrically conductive connections or optical fiber) and/or via wireless connections (e.g., according to one or more of IEEE 802.11x or other wireless standards). The gateway 180 can also include a modem (e.g., a cable modem) 186 and a gateway controller 187. The gateway controller 187 can be configured to control operation of the gateway, including both forward and reverse path communications and setting operating parameters.

To help improve stability and quality of user experience, the gateway 180 can include an adaptive rate limiting system 188. The adaptive rate limiting system 188 can include a respective session rate limiter 190. Each session rate limiter 190 is configured to dynamically set the bitrate limit for each session to provide corresponding rate-limited session data to an output system 192. The output system 192 can queue the session data from the session rate limiters 108 and send the rate-limited session data downstream to the in-home bottleneck link 194 for use by each of the respective adaptive bitrate streaming clients 182. The adaptive rate limiting system 188 and the individual session rate limiters for each respective session can be configured to operate according to the approaches disclosed herein (e.g., see FIGS. 1, 2 and 5).

To facilitate individual session rate limiting for a plurality of streaming media sessions (e.g., HAS sessions) active in a single in home network 184, the gateway 180 can include a monitor (e.g., the monitor 64 of FIG. 2) configured to identify each of the individual HAS sessions and pass each session through its corresponding SRL 190. For example, in the case of a managed gateway, this session identifying information may be provided automatically as part of the normal function of the control plane of the managed network.

While the example network system 150 of FIG. 4 demonstrates two adaptive rate limiting systems 164 and 188, there can be any number of more or less such adaptive rate limiting systems in such a network. Additionally, while the edge router is disclosed as a CMTS 152 and the network system 150 is disclosed in the context of a cable access system, the edge routers 152 and network system 150 could implemented in other examples according to other access technologies. Thus, the adaptive rate limiting systems 164 and 188 are equally applicable to other types of networks.

Figure 5:
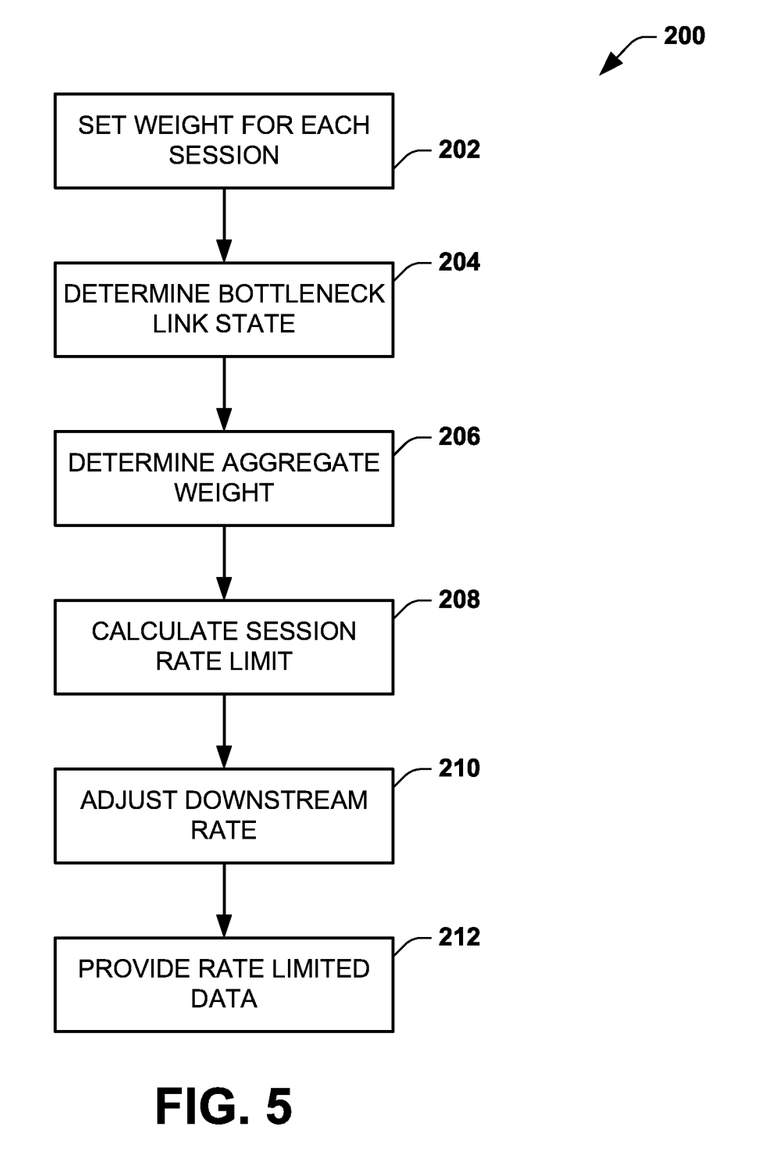
FIG. 5 illustrates an example of a method for performing adaptive rate limiting.

In view of the foregoing structural and functional features described above, a method of performing network-based adaptive rate limiting will be better appreciated with reference to FIG. 5. While, for purposes of simplicity of explanation, the methods of FIG. 5 is shown and described as executing serially, it is to be understood and appreciated that the invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention. The methods or portions thereof can be implemented as hardware, executable instructions (e.g., stored in a non-transitory storage medium) or as a combination of hardware and executable instructions.

FIG. 5 illustrates an example of a method 200 for performing adaptive rate limiting such as for adaptive streaming media traffic (e.g., HAS media traffic) provided to one or more adaptive bitrate streaming clients. As disclosed herein, the method 200 can be performed at a node that provides ingress to a bottleneck link of a network. The method begins at 202 in which weight for a given session is set. The weight can be assigned (e.g., by weight assignment function 72 of FIG. 2) for the given session based on administrative information received from an upstream node (e.g., a central office to set service level according to a service agreement) and/or based on information received from a downstream client. For example, a downstream HAS client (e.g., client 182 of FIG. 4) can provide instructions via signaling message to request a particular level of service for a given TCP connection (e.g., sufficient to maintain a minimum resolution).

At 204, bottleneck link state information can be determined. For example, the bottleneck state information can include an aggregate weight for the bottleneck link (e.g., determined by weight calculator 74 of FIG. 2), such as corresponding to the sum of the session weight (set at 202) for each of the active sessions. The bottleneck state information can also include an effective bandwidth target for the bottleneck link (e.g., determined by bandwidth target controller 84 of FIG. 2). As disclosed herein, the effective bandwidth target can be fixed (e.g., held constant for the bottleneck link regardless of the number of sessions or it can vary, such as a function of bandwidth utilization by downstream session clients (e.g., a time-averaged bandwidth measurement determined by filter 86 of FIG. 2). The effective bandwidth target can be set to a value that is less than or equal to the available bandwidth at the bottleneck link (e.g., B_target).

At 206, an aggregate weight can be determined (e.g., by weight calculator 74 of FIG. 2). This parameter could also be considered part of the bottleneck state information and thus be determined at 204. The determination at 206 can be constrained to include only active sessions (e.g., based on session activity state information provided by inactive connection detector 68 of FIG. 2). Thus, as session state information changes over time, the resulting aggregate bandwidth value will also change accordingly. Corresponding bandwidth utilization can also change over time, which can, in turn, result in adjustments to the effective target bandwidth that is utilized to set the session rate limit for each respective session.

At 208, a session rate limit is calculated (e.g., by session rate limit calculator 20 of FIG. 1 or 82 of FIG. 2) for a given streaming session. The session rate limit can be computed for the given streaming session based on the relative session weight (e.g., session weight/aggregate weight from 206) and the target bandwidth determined at 204. As disclosed herein (see, e.g., Eq. 1), the session rate limit can be determined for each of the plurality of active streaming media sessions.

At 210, a corresponding bitrate for the respective streaming session can be adjusted (e.g., either up or down by session rate limiter 83 of FIG. 2) based on the calculated session rate limit. The adjustment at 210 can correspond to rate limiting that can be implemented as one or more of traffic policing or traffic shaping for the given streaming session. For instance, the session rate limiting can adjust the rate by using a token bucket algorithm to control flow of downstream traffic for the given streaming session.

At 212, the corresponding rate-limited data for each session can be provided via the bottleneck link (e.g., including data for each of the plurality of active adaptive bitrate streaming sessions). In some examples, the rate-limited adaptive bitrate streaming sessions can further be mixed with high-speed data traffic, such as disclosed with respect to FIG. 3. If it is determined that that the rate limiting results in remaining available bandwidth not being used by the streaming sessions, the remaining extra bandwidth can be assigned to the high-speed data traffic.

Additionally, as disclosed herein, the method 200 can employ different timescales for one or more of the bandwidth measurements, adjusting the target bandwidth (at 206) compared to the time scale applied for enforcing the computed rate limit (at 210). For example, the target bandwidth can be adjusted at an interval that exceeds the time window over which the averaging of the bandwidth measurement is performed. Additionally, the decreases in the target bandwidth can occur on a time scale that is commensurate with or less than a fragment size of the given media session, whereas increases can occur on a time scale that is about equal to or greater than a fragment size of the given media session. The different time scales can be controlled to achieve rate limiting that improves stability among potentially competing adaptive streaming clients (e.g., HAS clients) that are receiving the different streaming sessions.

In view of the foregoing, it will be appreciated that the adaptive rate limiting approach thus can mitigate stalls, improve video quality, and improve stability of streaming video media. The approach disclosed herein can further be utilized with existing rate limiter mechanisms, such as including traffic policing token bucket algorithms, traffic shaping token bucket algorithms. Such existing traffic controls can be utilized without requiring modifications to or communication with adaptive bitrate streaming clients. Thus, the network-based rate limiting approach disclosed herein is generally applicable to third party adaptive bitrate streaming clients.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method comprising:
   assigning a weight to a given streaming session of a plurality of adaptive streaming media sessions provided to a network node that feeds a bottleneck link;
   calculating a rate limit for the given streaming session based on the assigned weight and based on an effective target bandwidth for providing streaming media traffic to the plurality of adaptive streaming media sessions via the bottleneck link, wherein calculating the rate limit for the given streaming session comprises:
   computing a relative weight for the given streaming session as a function of the assigned weight relative to an aggregate of weight values for the plurality of adaptive streaming media sessions determined to be active, and
   multiplying the relative weight and the effective target bandwidth to provide the rate limit for the given streaming session; and
   adjusting a downstream rate for the given streaming session according to the calculated rate limit.

2. The method of claim 1, further comprising randomizing the weight assigned to the given streaming session relative to a weight value of at least one other of the plurality of adaptive streaming media sessions.

3. The method of claim 1, wherein adjusting the downstream rate comprises at least one of traffic policing or traffic shaping for the given streaming session.

4. The method of claim 3, wherein the adjusting further comprises using a token bucket to control flow of downstream traffic for the given streaming session.

5. The method of claim 1, wherein the effective target bandwidth is adjusted based on a measured bandwidth for the bottleneck link.

6. The method of claim 5, wherein the measured bandwidth comprises a time-averaged bandwidth measurement for the plurality of adaptive streaming media sessions, the averaging being performed over a time window that exceeds a time for processing a media fragment by an adaptive streaming client that receives at least a portion of the given streaming session.

7. The method of claim 6, further comprising adjusting the effective target bandwidth at an interval that exceeds the time window over which the averaging of the measured bandwidth is performed.

8. The method of claim 6, wherein if the measured bandwidth for the bottleneck link exceeds a predetermined target bandwidth for the bottleneck link, the method comprises decreasing the effective target bandwidth for the plurality of adaptive streaming media sessions.

9. The method of claim 6, wherein if the measured bandwidth for the bottleneck link is less than a predetermined target bandwidth for the bottleneck link, increasing the effective target bandwidth for the plurality of adaptive streaming media sessions, the increasing being controlled to occur on a time scale that is about equal to or greater than a fragment size of the given streaming session.

10. The method of claim 1, further comprising:
    performing the rate limiting for each of the plurality of adaptive streaming media sessions according to a respective rate limit calculated for each of the plurality of adaptive streaming media sessions to provide corresponding rate-limited streaming sessions; and
    providing the corresponding rate-limited streaming sessions downstream as rate-limited streaming traffic, via the bottleneck link, to a plurality of adaptive streaming clients configured to receive the streaming sessions.

11. The method of claim 10, further comprising mixing the rate-limited streaming traffic with other high speed data traffic that is provided to the plurality of adaptive streaming clients via the bottleneck link.

12. The method of claim 11, further comprising:
    in response to determining that the rate limiting results in remaining available bandwidth not used by the plurality of adaptive streaming media sessions, assigning the remaining available bandwidth to the other high speed data traffic.

13. An apparatus comprising:
    a session rate limit calculator configured to compute a session rate limit for a given session of a plurality of adaptive streaming media sessions based on state information for the given session and state information for a downstream bottleneck link to which the apparatus feeds the plurality of adaptive streaming media sessions;
    a rate limiter configured to control downstream traffic for the given session based on the session rate limit and to provide corresponding rate-limited downstream traffic for the given session; and
    a control system configured to control an effective target bandwidth based on a time-averaged measurement of bandwidth for the downstream bottleneck link, the session rate limit calculator being configured to compute the session rate limit for the given session based on the effective target bandwidth.

14. The apparatus of claim 13, further comprising:
    a weight assignment component configured to assign a weight value to the given session, the session rate limit calculator being further configured to compute a relative weight for the given session as a function of the assigned weight value relative to an aggregate of weight values of the plurality of adaptive streaming media sessions, the session rate limit calculator computing the session rate limit for the given session based on the relative weight and the effective target bandwidth.

15. The apparatus of claim 13, wherein the control system further comprises a bandwidth adjustment control configured to:
decrease the effective target bandwidth for the plurality of adaptive streaming media sessions if a measured bandwidth for the bottleneck link exceeds a predetermined target bandwidth for the bottleneck link; and
increase the effective target bandwidth for the plurality of adaptive streaming media sessions if the measured bandwidth for the bottleneck link is less than the predetermined target bandwidth for the bottleneck link.

16. The apparatus of claim 13, further comprising a traffic monitor configured to identify streaming data packets for a plurality of related transfer control protocol connections and to group the streaming data packets for the plurality of related transfer control protocol connections to provide the given session.

17. The apparatus of claim 13, wherein the session rate limit calculator further comprises a plurality of rate limit calculators to compute a respective session rate limit for each of the plurality of adaptive streaming media sessions;
wherein the rate limiter further comprises a plurality of rate limiters to adjust a session bitrate for each of the plurality of adaptive streaming media sessions based on a respective rate limit calculated for each respective one of the plurality of adaptive streaming media sessions and provide a respective rate-limited streaming session; and
the respective rate-limited streaming sessions being provided as rate-limited streaming traffic, via a bottleneck link, to a plurality of adaptive streaming clients configured to receive the streaming sessions.

18. A method comprising:
computing, by a session rate limit calculator, a session rate limit for a given session of a plurality of adaptive streaming media sessions based on state information for the given session and state information for a downstream bottleneck link to which an apparatus feeds the plurality of adaptive streaming media sessions;
controlling, by a rate limiter, downstream traffic for the given session based on the session rate limit;
providing, by the rate limiter, corresponding rate-limited downstream traffic for the given session; and
controlling, by a control system, an effective target bandwidth based on a time-averaged measurement of bandwidth for the downstream bottleneck link, wherein computing, by the session rate limit calculator, the session rate limit comprises computing the session rate limit for the given session based on the effective target bandwidth.

19. The method of claim 18, further comprising:
assigning, by a weight assignment component, a weight value to the given session; and
computing, by the session rate limit calculator, a relative weight for the given session as a function of the assigned weight value relative to an aggregate of weight values of the plurality of adaptive streaming media sessions, the session rate limit calculator computing the session rate limit for the given session based on the relative weight and the effective target bandwidth.

20. The method of claim 18, further comprising:
identifying, by a traffic monitor, streaming data packets for a plurality of related transfer control protocol connections; and
grouping, by the traffic monitor, the streaming data packets for the plurality of related transfer control protocol connections to provide the given session.

* * * * *